United States Patent
Woköck et al.

(10) Patent No.: US 10,112,326 B2
(45) Date of Patent: Oct. 30, 2018

(54) DEVICE AND METHOD FOR PRODUCING AN EDGING OF A FLAT EXTENDED PANEL

(71) Applicant: Webasto SE, Stockdorf (DE)

(72) Inventors: Jan Woköck, Bad Aibling (DE); Martin Seebass, Gauting (DE)

(73) Assignee: WEBASTO SE, Stockdorf (DE)

( * ) Notice: Subject to any disclaimer, the term of this patent is extended or adjusted under 35 U.S.C. 154(b) by 53 days.

(21) Appl. No.: 15/118,826

(22) PCT Filed: Feb. 19, 2014

(86) PCT No.: PCT/EP2014/053244
§ 371 (c)(1),
(2) Date: Aug. 12, 2016

(87) PCT Pub. No.: WO2015/124181
PCT Pub. Date: Aug. 27, 2015

(65) Prior Publication Data
US 2017/0057125 A1    Mar. 2, 2017

(51) Int. Cl.
*B29C 39/10* (2006.01)
*B29C 39/24* (2006.01)
(Continued)

(52) U.S. Cl.
CPC ............ *B29C 39/24* (2013.01); *B29C 31/045* (2013.01); *B29C 33/0038* (2013.01);
(Continued)

(58) Field of Classification Search
CPC ... B29C 33/0038; B29C 39/10; B29C 44/581; B29C 70/763
See application file for complete search history.

(56) References Cited

U.S. PATENT DOCUMENTS

| 5,344,603 A | 9/1994 | Jardin et al. |
| 5,421,940 A | 1/1995 | Cornils et al. |
| (Continued) | | |

FOREIGN PATENT DOCUMENTS

| CN | 1612797 A  | 5/2005 |
| DE | 4103047 A1 | 8/1992 |
| (Continued) | | |

OTHER PUBLICATIONS

International Search Report for PCT/EP2014/053244 dated Apr. 4, 2014; English Translation submitted herewith (5 Pages).

*Primary Examiner* — James Sanders
(74) *Attorney, Agent, or Firm* — Fitch, Even, Tabin & Flannery, LLP

(57) ABSTRACT

A device for producing an edging of a flat extended panel has: a molding tool; a material dispenser which is movable in relation to the molding tool, for dispensing a material for the edging, wherein the molding tool has: a first mold body having a holding region for the panel; a second mold body having a holding region for the panel such that the panel is capable of being held by the first mold body and by the second mold body; a third mold body which with the first mold body shares a common contact region, wherein the first mold body, the second mold body, and the third mold body are configured such that they conjointly with the panel surround a space in which the edging is configurable; an access duct to the space, the former being configured between the second mold body and the third mold body.

6 Claims, 7 Drawing Sheets

(51) Int. Cl.
  *B29C 70/76* (2006.01)
  *B29C 31/04* (2006.01)
  *B29C 33/00* (2006.01)
  *B29C 33/10* (2006.01)
  *B29C 39/26* (2006.01)
  *B29C 44/02* (2006.01)
  *B29C 44/12* (2006.01)
  *B29C 44/34* (2006.01)
  *B29C 44/58* (2006.01)
  *B29L 12/00* (2006.01)
  *B29L 31/30* (2006.01)
  *B29C 39/00* (2006.01)
  *B29K 75/00* (2006.01)
  *B29K 105/04* (2006.01)
  *B29K 709/08* (2006.01)
  *B60J 7/04* (2006.01)

(52) U.S. Cl.
  CPC .......... *B29C 33/0061* (2013.01); *B29C 33/10* (2013.01); *B29C 39/10* (2013.01); *B29C 39/26* (2013.01); *B29C 44/025* (2013.01); *B29C 44/1271* (2013.01); *B29C 44/351* (2013.01); *B29C 44/581* (2013.01); *B29C 70/763* (2013.01); *B29C 39/006* (2013.01); *B29K 2075/00* (2013.01); *B29K 2105/04* (2013.01); *B29K 2709/08* (2013.01); *B29L 2012/00* (2013.01); *B29L 2031/3005* (2013.01); *B60J 7/04* (2013.01)

(56) References Cited

U.S. PATENT DOCUMENTS

| | | |
|---|---|---|
| 5,489,409 A | 2/1996 | Koganezawa et al. |
| 5,507,994 A | 4/1996 | Cornils et al. |
| 7,871,555 B2 | 1/2011 | Orien et al. |
| 8,328,972 B2 | 12/2012 | Bracke |
| 2004/0118079 A1 | 6/2004 | Orten et al. |
| 2007/0246973 A1 | 10/2007 | Huebner et al. |
| 2014/0049076 A1 | 2/2014 | Roeder et al. |
| 2016/0031124 A1 | 2/2016 | Van Dyck |

FOREIGN PATENT DOCUMENTS

| | | |
|---|---|---|
| DE | 4232554 C1 | 1/1994 |
| DE | 29814743 U1 | 12/1999 |
| DE | 102012003045 A1 | 8/2013 |
| EP | 0634263 A1 | 1/1995 |
| EP | 1577080 B1 | 11/2006 |
| EP | 1638696 B1 | 10/2007 |
| EP | 2024413 B1 | 7/2010 |
| EP | 1896240 B1 | 8/2011 |
| EP | 1305189 B1 | 12/2011 |
| EP | 1970257 B1 | 12/2011 |
| EP | 2275307 B1 | 12/2012 |
| JP | H04-226321 A | 8/1992 |
| JP | H07-080854 A | 3/1995 |

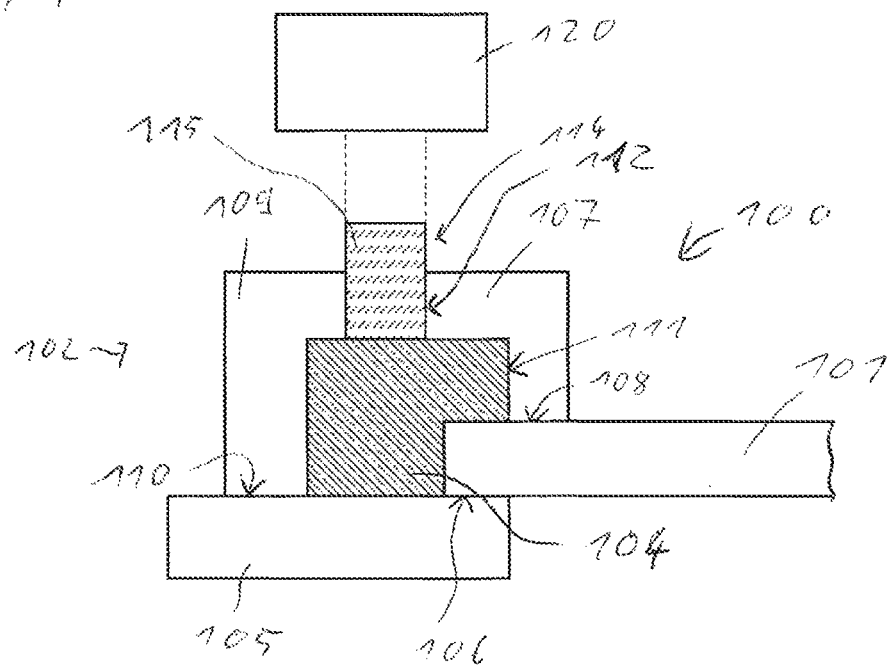
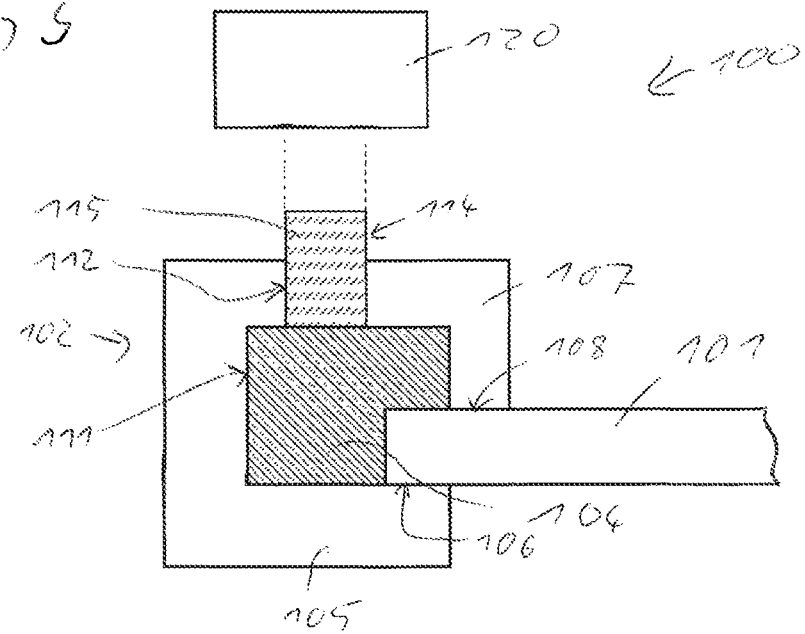

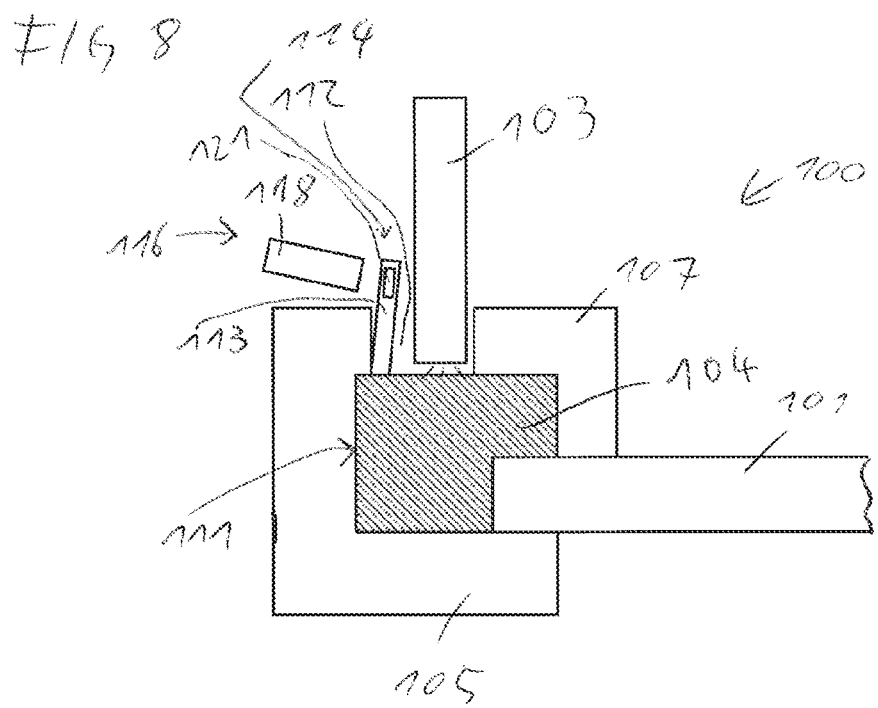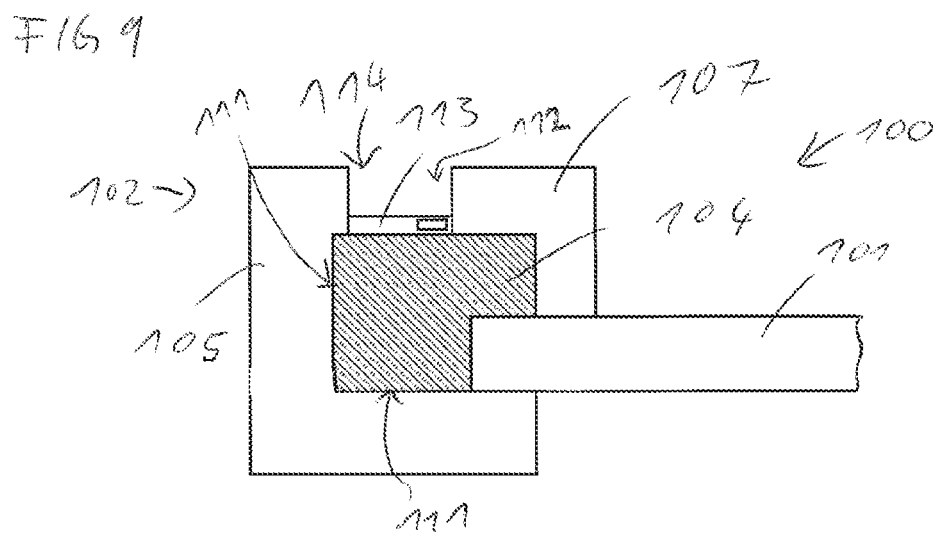

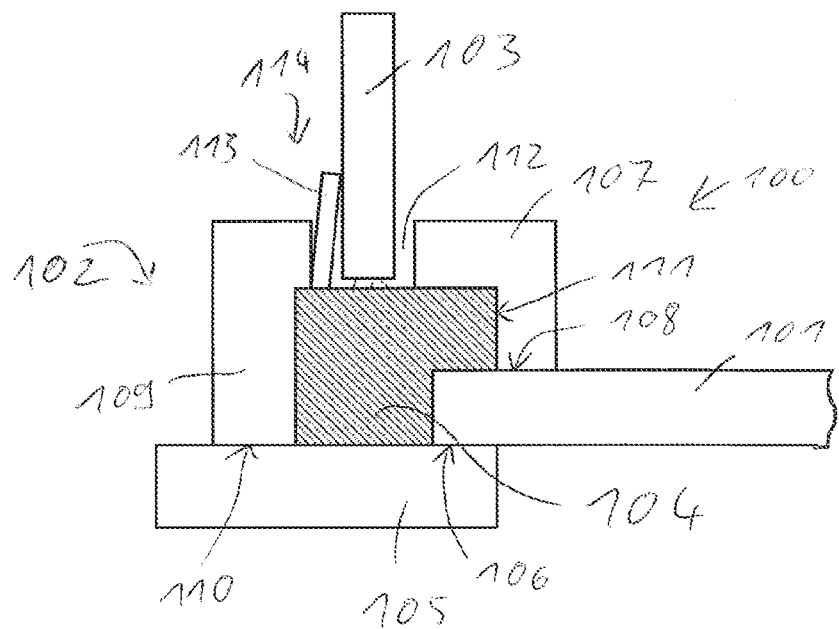
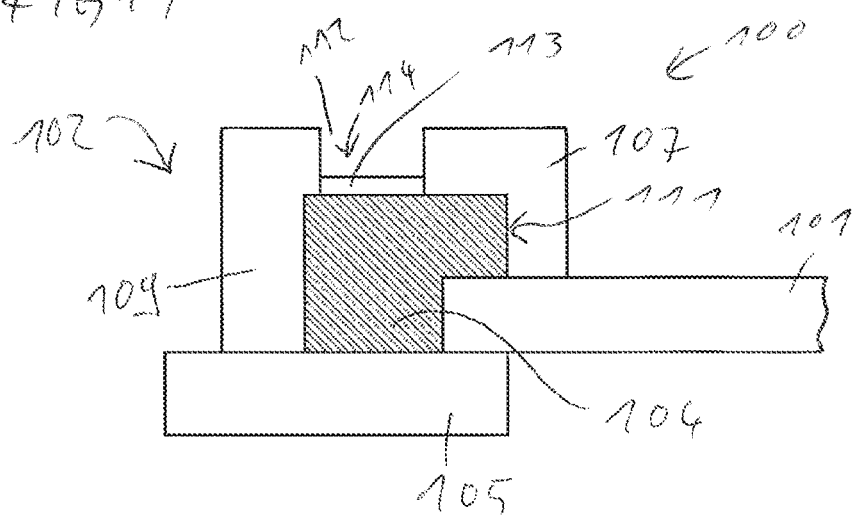

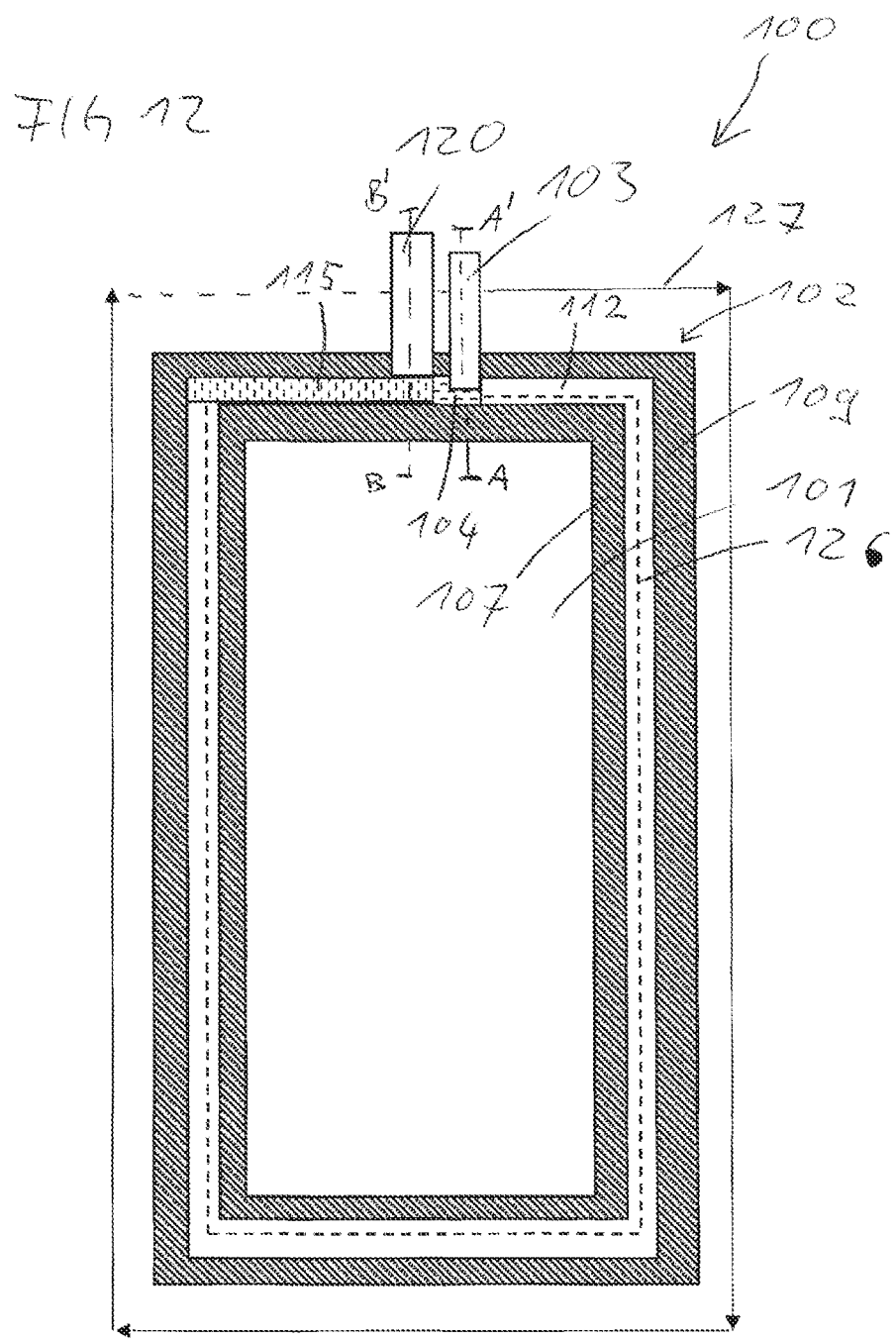

DEVICE AND METHOD FOR PRODUCING AN EDGING OF A FLAT EXTENDED PANEL

CROSS-REFERENCE TO RELATED APPLICATIONS

This application is a U.S. national phase application filed under 35 U.S.C. § 371 of International Application No. PCT/EP2014/053244, filed Feb. 19, 2014, designating the United States, which is hereby incorporated herein by reference in its entirety for all purposes.

FIELD

The invention relates to devices for producing an edging of a flat extended panel, in particular an edging of a pane for a roof of a vehicle. The invention furthermore relates to methods for producing an edging of a flat extended panel, in particular an edging of a pane for a roof of a vehicle.

BACKGROUND

Roofs of vehicles may have an opening which is closed by a pane. Such roof assemblies are also referred to as panoramic roofs. The pane is transparent or semi-transparent, for example, such that light from outside the vehicle can reach the interior, and that the vehicle occupants may be afforded a view to the outside. Such panes may be stationary or movable roof elements made from glass, for example. A plastics edging, for example a foam molding, is provided in the peripheral region of the lid.

EP 1 577 080 describes a method for foam-molding a pane, an opening mold piece being used therein. On account thereof, a surface of the foam molding cures without contact with the mold piece.

It is desirable for devices for producing an edging of a flat extended panel to be stated which in each case enable simple and reliable production. Moreover, it is desirable for methods for producing an edging of a flat extended panel to be stated which in each case are capable of being carried out in a simple and reliable manner.

SUMMARY

According to one aspect of the invention, a device for producing an edging of a flat extended panel has a molding tool and a material dispenser. The material dispenser is movable in relation to the molding tool. The material dispenser is configured for dispensing a material for the edging. The molding tool has a first mold body having a holding region for the panel. The molding tool has a second mold body having a holding region for the panel. The panel is capable of being held by the first mold body and by the second mold body. The molding tool has a third mold body which with the first mold body shares a common contact region. The first mold body, the second mold body, and the third mold body are configured such that they conjointly with the panel surround a space in which the edging is configurable. An access duct to the space is configured between the second mold body and the third mold body. The access duct enables in particular access by the material dispenser to the space.

The flat extended panel is in particular a pane, for example a glass pane or a plastics pane. The panel is transparent or at least semi-transparent, for example. During operation, the panel serves as a lid for an opening in a roof of a vehicle, in particular of a passenger automobile, for example.

The molding tool for configuring the edging has three mold bodies. The material dispenser is movable in relation to each mold body. The three mold bodies collectively surround the space which predefines the external shape of the edging, once the material has been cured. Modification of the external shape of the edging is thus possible in a simple and effortless manner by replacing one of the mold bodies and retaining the two other mold bodies.

For example, the two mold bodies which hold the panel are retained, and the third mold body in the case of each panel or for each series of panels is correspondingly modified, depending on the desired shape of the edging. For example, an internal face of the third mold body is configured such that a seal lip is created on the edging. According to further embodiments, the internal face of the third mold body is configured differently, for example such that a face for fitting further elements to the edging is created.

The three mold bodies are configured so as to be mutually separate, for example. In particular, the second mold body and the third mold body are disposed so as to be movable in relation to one another. According to some embodiments, the second mold body and the first mold body are disposed so as to be movable in relation to one another. In particular, the second mold body and the third mold body do not share any common contact face, in particular being at all times disposed so as to be mutually spaced apart.

According to some embodiments, an elastic lip seal is fixed to the second mold body and/or to the third mold body, so as to close and temporarily unblock the access duct. According to some embodiments, the lip seal is fixed to the second mold body only. According to further embodiments, the elastic lip seal is fixed to the third mold body only.

According to further embodiments, the elastic lip seal is in multiple parts, for example in two parts. One part is fixed to the second mold body, a further part being fixed to the third mold body.

The lip seal is configured such that the former is movable from the rest position thereof, so as to unblock the access duct for the material dispenser. In particular, the lip seal is configured such that the access duct is unblocked only on one region, being closed by the lip seal outside that region. After the material has been introduced into the space, the space in the access duct is thus also closed. The molding tool then is a closed molding tool.

According to further embodiments, alternatively or additionally to the lip seal, the device has a separate closure element. The closure element is introducible into the access duct, so as to close the access duct. The closure element is configured for closing the access duct such that the space is a closed space. The space is a closed space, once the material by means of the material dispenser has been introduced into the space, since the access duct is closed by the closure element. A closed molding tool is thus provided. The closure element is configured separately from the mold bodies of the molding tool. The closure element is movable in relation to the mold bodies, not being fixed to any of the mold bodies. The mold bodies and the separate closure element are initially discrete construction elements. The separate closure element comes into contact with one of the mold bodies or both mold bodies only once the material has been introduced into the space. The closure element is a flexible sealing tape, for example. The flexible sealing tape is installable in the access duct.

According to further aspects of the invention, a device for producing an edging of a flat extended panel has a molding tool and a material dispenser. The material dispenser is movable in relation to the molding tool. The material dispenser serves for dispensing a material for the edging. The molding tool has a first mold body having a holding region for the panel. The molding tool has a second mold body having a holding region for the panel. The panel is capable of being held by the first mold body and by the second mold body. The first mold body and the second mold body are configured such that they conjointly with the panel surround a space in which the edging is configurable. The molding tool has an access duct to the space, the former being configured between the first mold body and the second mold body. A separate closure element is introducible into the access duct, so as to close the access duct in order for the space to be a closed space. In particular, the access duct enables access by the material dispenser to the space.

The flat extended panel is in particular a pane, for example a glass pane or a plastics pane. The panel is transparent or at least semi-transparent, for example. During operation, the panel serves as a lid for an opening in a roof of a vehicle, in particular of a passenger automobile, for example.

The separate closure element is movable in relation to the first mold body and to the second mold body. The closure element is configured separately from the mold bodies, not being fixed to any of the mold bodies. The mold bodies and the closure element are initially discrete construction elements. The closure element comes into contact with one of the mold bodies or both mold bodies only once the material has been introduced into the space. The closure element is a flexible sealing tape, for example, which is installable in the access duct. The space is closed by the panel, by the two mold bodies, and by the closure element.

According to further aspects of the invention, a device for producing an edging of a flat extended panel has a molding tool and a material dispenser which is movable in relation to the molding tool. The material dispenser serves for dispensing a material for the edging. The molding tool has a first mold body having a holding region for the panel. The molding tool has a second mold body having a holding region for the panel. The panel is capable of being held by the first mold body and by the second mold body. The first mold body and the second mold body are configured such that they conjointly with the panel surround a space in which the edging is configurable. The molding tool has a movable closure element which is fixed to the first mold body and/or to the second mold body, so as to close and temporarily unblock an access duct. The device furthermore has an opening device. The opening device is configured separately from the material dispenser. The opening device is configured in order for the closure element to be moved for unblocking the access duct. In particular, the access duct enables access by the material dispenser to the space.

The flat extended panel is in particular a pane, for example a glass pane or a plastics pane. The panel is transparent or at least semi-transparent, for example. During operation, the panel serves as a lid for an opening in a roof of a vehicle, in particular of a passenger automobile, for example.

The closure element is movable independently of the material dispenser. The closure element is movable by the opening device so as to unblock the access duct for the material dispenser. In order for the material to be introduced into the space, the material dispenser is introducible into the access duct without contacting the closure element. The closure element is an elastic lip seal, for example. The closure element is fixed to the first mold body, alternatively or additionally to the second mold body.

For example, the opening device comprises a compressed-air device in order for the closure element to be moved by means of compressed air. Alternatively or additionally, the opening device comprises a magnetic device in order for the closure element to be moved by means of a magnetic force.

Alternatively or additionally, the opening device comprises a lifting device which, in order for the closure element to be mechanically moved, comes into contact with the closure element. According to further embodiments, the opening device, alternatively or additionally, comprises one or a plurality of further devices which are adapted for moving the closure element, for example a vacuum device in order for the closure element to be moved by suction.

According to further aspects of the invention, a method for producing an edging of a flat extended panel comprises providing the panel. A first mold body is provided. The panel is laid onto the first mold body. A second mold body is disposed on the panel. A third mold body is disposed such that the third mold body contacts the first mold body, wherein a space between the first mold body, the second mold body, and the third mold body, having an access duct between the second mold body and the third mold body, is configured.

A material for the edging is introduced through the access duct into the space. A flexible design of the edging is made possible by disposing three separate mold bodies. The three mold bodies are moved in relation to one another, so as to hold the panel and to configure the space. The second mold body and the third mold body do not come into mutual contact. An internal face of the third mold body serves for configuring the external shape of the edging. The third mold body does not serve for holding the panel.

According to further embodiments, an elastic lip seal which is fixed to the second mold body and/or to the third mold body is moved. On account thereof, the access duct is unblocked. The material is subsequently introduced through the unblocked access duct. The access duct is subsequently closed. In particular, the access duct is only unblocked in regions, so as to enable the introduction of a material dispenser. The access duct remains closed laterally of the material dispenser and of the unblocked region. The material dispenser in relation to the panel and to the molding tool moves along a periphery of the panel, so as to configure the edging. The access duct, ahead of the material dispenser and behind the same, when viewed in the movement direction of the material dispenser, remains closed. The unblocked region in relation to the molding tool moves conjointly with the material dispenser. For example, the elastic lip seal is moved by the material dispenser. According to further embodiments, the elastic lip seal is moved by means of an opening device which is configured separately from the material dispenser.

On account of the access duct being closed outside the unblocked region for the material dispenser, a closed space for the edging is provided. The material introduced for the edging contacts elements of the molding tool on all sides. On account thereof, the external shape of the edging is capable of being accurately predefined.

According to further embodiments, alternatively or additionally to the elastic lip seal, a separate closure element is installed in the access duct once the material has been introduced into the space. The separate closure element closes the access duct, the space being closed on account thereof. A material dispenser in relation to the molding tool and to the panel moves along a periphery of the panel. Material for the edging is hereby dispensed into the space. When viewed in the movement direction of the material dispenser, the separate closure element is installed in the access duct behind the material dispenser, so as to close the latter. The material for the edging thus contacts an element of the molding tool on all sides. Installing the separate closure element comprises installing a flexible sealing tape in the access duct, for example.

According to further aspects of the invention, a method for producing an edging of a flat extended panel comprises providing the panel. A first mold body is provided. The panel is laid onto the first mold body. A second mold body is disposed on the panel, wherein a space between the first mold body and the second mold body, having an access duct between the first mold body and the second mold body, is configured. Material for the edging is introduced through the access duct into the space. A separate closure element is installed in the access duct after the material has been introduced into the space, so as to close the access duct. On account thereof, the space is closed.

A flexible sealing tape is installed in the access duct as the closure element, for example. The space between the mold bodies is initially open at the access duct. The material is introduced into the space by means of a material dispenser, for example. The material dispenser is moved in relation to the molding tool and the panel. When viewed in the movement direction of the material dispenser, the separate closure element is installed in the access duct behind the material dispenser. On account thereof, the space is closed. Thus, once the material has been introduced into the molding tool, it is surrounded by the molding tool on all sides. The external shape of the edging is thus accurately configurable.

According to further aspects of the invention, a method for producing an edging of a flat extended panel comprises providing the panel. A first mold body is provided. The panel is laid onto the first mold body. A second mold body is disposed on the panel, wherein a space between the first mold body and the second mold body, having an access duct between the first mold body and the second mold body, is configured. A closure element which is fixed to the first mold body and/or to the second mold body is moved. On account thereof, the access duct is unblocked. The closure element is moved by means of an opening device which is configured separately from a material dispenser for dispensing a material for the edging. The material is introduced by means of the material dispenser through the unblocked access duct into the space. The access duct is closed.

The access duct is capable of being unblocked by the opening device independently of the material dispenser. In particular, the access duct is unblocked by the opening device in regions only, so as to enable the introduction of the material dispenser into the unblocked region. The access duct is closed ahead of and behind the unblocked region. The material dispenser in relation to the panel and to the molding tool moves along a periphery of the panel, so as to configure the edging. For example, the opening device moves in a manner corresponding to the material dispenser such that the unblocked region moves along the access duct. When viewed in the movement direction of the opening device or of the material dispenser, respectively, the opening device leaves the access duct ahead of and behind the material dispenser closed. On account thereof, the material of the edging which has been introduced during curing in the space contacts elements of the molding tool on all sides. On account thereof, the external shape of the edging is accurately producible.

The respective features and advantages stated in the context of the individual devices may also be applied in the context of the further devices and methods, and vice versa.

Further advantages, features, and refinements are derived from the examples hereunder which are explained in conjunction with the figures. Elements herein which are identical, equivalent, or of identical function may be provided with identical reference signs. The elements illustrated and the size ratios thereof are not mandatorily to scale. Rather, for the purpose of ease of illustration, individual elements or regions may be illustrated so as to be excessively thick or large.

BRIEF DESCRIPTIONS OF THE DRAWINGS

In the figures:

FIG. 4 shows a schematic illustration of a cross section through a device for producing an edging, according to embodiments;

FIG. 5 shows a schematic illustration of a cross section through a device for producing an edging, according to embodiments;

FIG. 8 shows a schematic illustration of a cross section through a device for producing an edging, according to embodiments;

FIG. 9 shows a schematic illustration of a cross section through a device for producing an edging, according to embodiments;

FIG. 10 shows a schematic illustration of a cross section through a device for producing an edging, according to embodiments;

FIG. 11 shows a schematic illustration of a cross section through a device for producing an edging, according to embodiments; and FIG. 12 shows a schematic illustration of a plan view of a device for producing an edging, according to embodiments.

DETAILED DESCRIPTION

Figure 1:
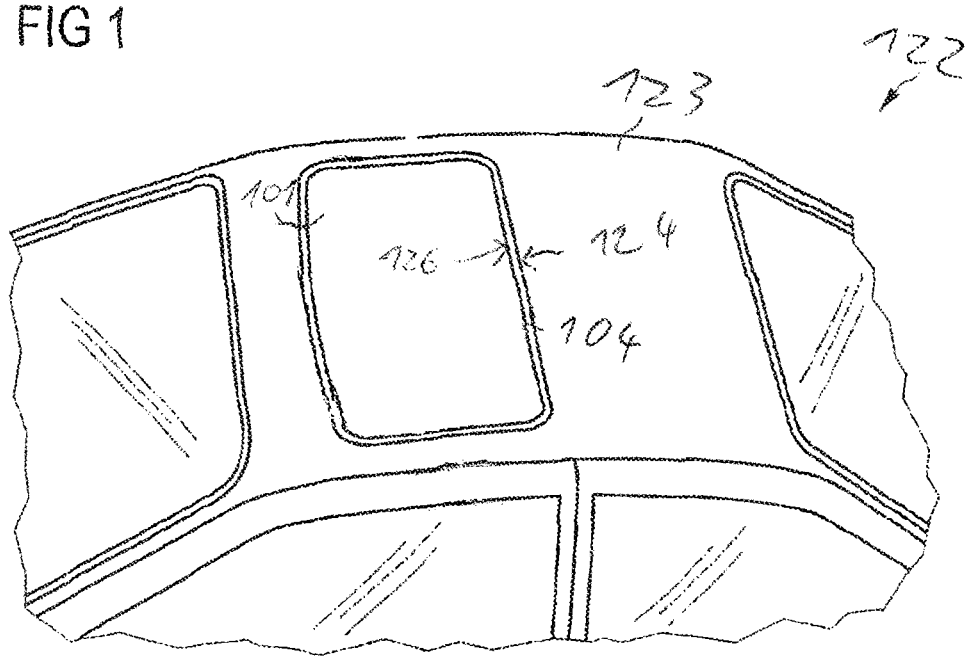
FIG. 1 shows a schematic illustration of a roof of an automobile, according to embodiments.

FIG. 1 shows a schematic illustration of a roof 123 of a vehicle 122, according to embodiments, in particular the roof 123 of a passenger automobile. The roof 123 has a roof opening 124 which is closed by a panel 101. The panel on the periphery 126 thereof is entirely or partially surrounded by an edging 104.

The panel 101 is a glass lid or a plastics lid, for example, which is disposed so as to be immovable in relation to the roof 123, closing the roof opening 124. According to further embodiments, the panel 101 is movable in relation to the roof 123, so as to partially unblock or selectively close the roof opening 124 during operation. For example, the panel 101 is part of a panoramic roof, of a spoiler-type roof, of a sliding roof, for example of an outwardly guided sliding roof, and/or of a sliding/tilting roof, and/or of a fixed roof element. According to embodiments, the panel 101 by way of further elements is fittable to the roof 123 from the internal side of the vehicle 122. According to embodiments, the panel 101 by way of further elements is fittable to the roof 123 from the external side of the vehicle 122.

The lid which is disposed on the roof opening 124, according to embodiments which are not explicitly illustrated, has two or more panels 101. For example, one of the panels 101 is disposed so as to be immovable in relation to the roof 123, and a further one of the panels is disposed so as to be movable in relation to the roof 123. According to embodiments, each panel 101 on the periphery 126 thereof is entirely or partially surrounded by an edging 104. According to further embodiments, part of the panels 101 on the periphery 126 thereof is entirely or partially surrounded by an edging 104. A further part of the panels 101 has no edging or an edging which is of dissimilar configuration to that of the edging 104.

Figure 2:
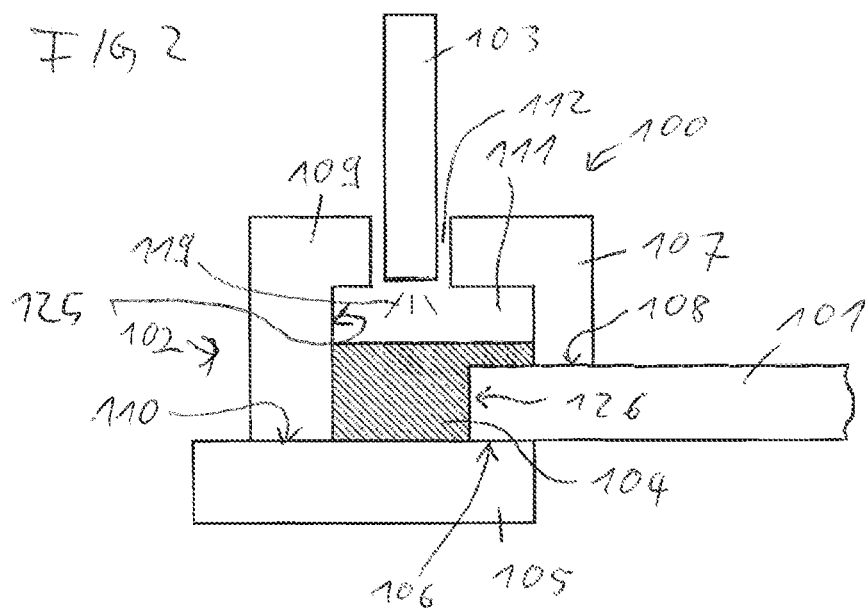
FIG. 2 shows a schematic illustration of a cross section through a device for producing an edging, according to embodiments.

FIG. 2 shows a schematic illustration of a cross section through a device 100 for producing the edging 104, according to embodiments. The illustration corresponds to a schematic section along the line A-A' of FIG. 12, transversely to the main direction of extent of the panel 101.

The device 100 has a molding tool 102. The molding tool 102 comprises a first mold body 105 having a holding region 106 for the panel 101. A second mold body 107 has a holding region 108 for the panel 101. A third mold body 109 is disposed such that the first mold body 105 and the third mold body 109 share a common contact region 110. An access duct 112 to a space 111 is configured between the second mold body 107 and the third mold body 109. The space 111 in the cross section illustrated is delimited by the panel 101, by the first mold body 105, by the second mold body 107, and by the third mold body 109, the access duct 112 remaining unblocked. Internal faces 125 of the three mold bodies 105, 107, and 109 are configured so as to correspond to a desired external shape of the edging 104.

In order for the edging 104 to be produced, a material dispenser 103 is at least partially introduced into the molding tool 102 through the access duct 112. The material dispenser 103 introduces the material 119 for the edging 104 into the space 111. Here, the material dispenser 103 in relation to the molding tool 102 and to the panel 101 is moved along a periphery 126 of the panel 101 through the access duct 112. The material dispenser 103 is moved such that the space 111 is gradually entirely or almost entirely filled. For example, the device 100 is disposed obliquely such that the material within the space 111, prior to curing, by way of gravity is moved in a direction which is counter to a movement direction 127 of the material dispenser 103 (FIG. 12). As good as possible filling of the space 111 is possible on account thereof. When viewed in the movement direction 127, the space 111 ahead of the material dispenser 103 is not and only barely filled with the material 119. When viewed in the movement direction 127, the space 111 behind the material dispenser 103 is filled with the material 119.

The material 119 comprises polyurethane, for example. The material 119 in a first state is introduced into the space 101 by the material dispenser 103, and is subsequently cured. Substantially atmospheric pressure or a pressure which is only insignificantly higher than the atmospheric pressure prevails in the space 111. On account thereof, the mold bodies 105, 107, and 109 do not need to be tightly pressed together or onto the panel 101, respectively, either. Damage may be avoided on account thereof. Moreover, comparatively soft materials which would not withstand high pressures may be used.

The material 119 is of low dynamic viscosity. The material 119 has a dynamic viscosity of less than 200 kg/(ms), for example, less than 50 kg/(ms), for example, in particular less than 15 kg/(ms) (in each case at a shear velocity of 1/s).

The three mold bodies 105, 107, and 109 are construction elements which are configured separately from one another. In particular, each of the mold bodies 105, 107, and 109 is movable in relation to the respective others. While the material 119 is being introduced into the space, the mold bodies 105, 107, and 109 are preferably not moved in relation to one another. The third mold body 109 does not contact the panel 101. The third mold body 109 does not serve for holding the panel 101. The third mold body 109 serves for configuring the external shape of the edging 104 in that region that corresponds to the internal face 125 of the third mold body 109. Various shapes for the edging are implementable in a simple manner by replacing the third mold body 109, for example. The two mold bodies 105 and 107 herein may be retained. Various shapes for the edging 104 are thus implementable in a simple manner, using one device 100.

According to embodiments, the internal faces 125 of the three mold bodies 105, 107, and 109, at least in those regions in which the former come into contact with the material 119 of the edging 104, are configured such that the edging 104 after curing does not or does not substantially adhere to the internal faces 125. The internal faces 125 are silicone-coated, for example.

Figure 3:
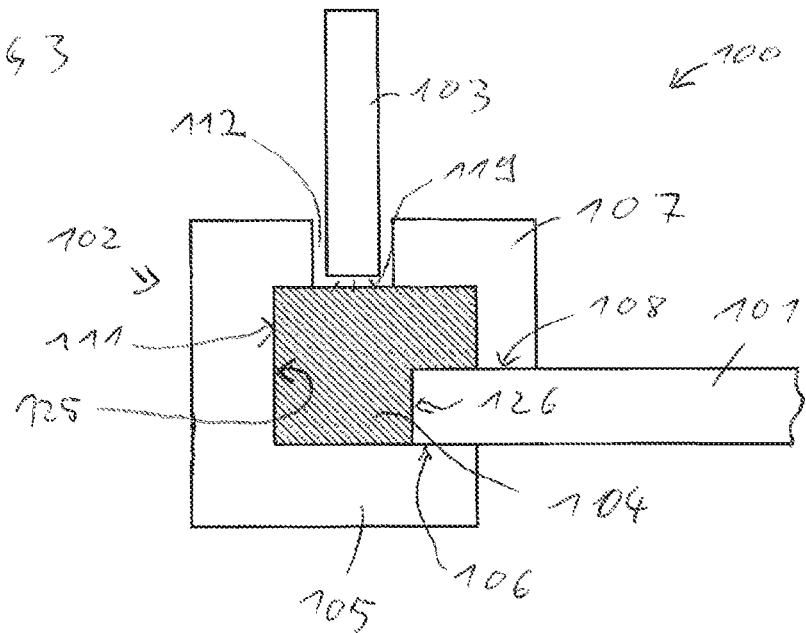
FIG. 3 shows a schematic illustration of a cross section through a device for producing an edging, according to embodiments.
Figure 6:
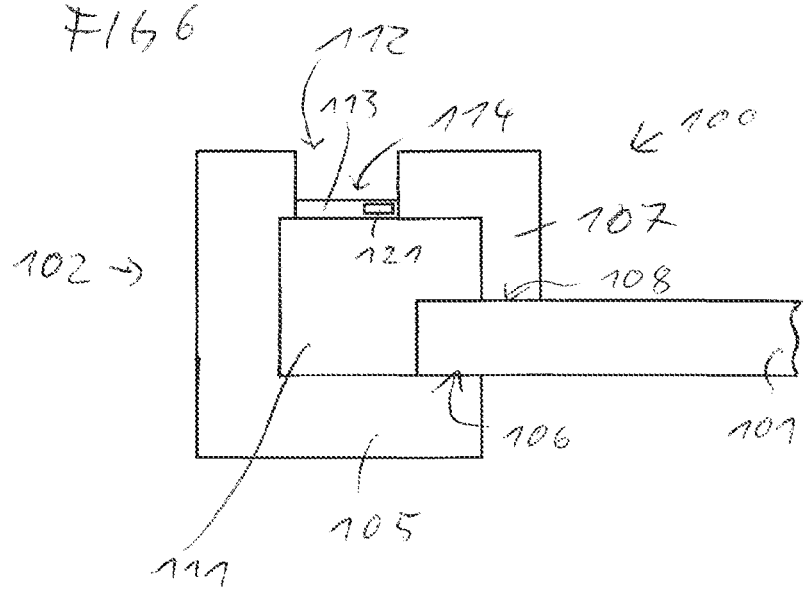
FIG. 6 shows a schematic illustration of a cross section through a device for producing an edging, according to embodiments.
Figure 7:
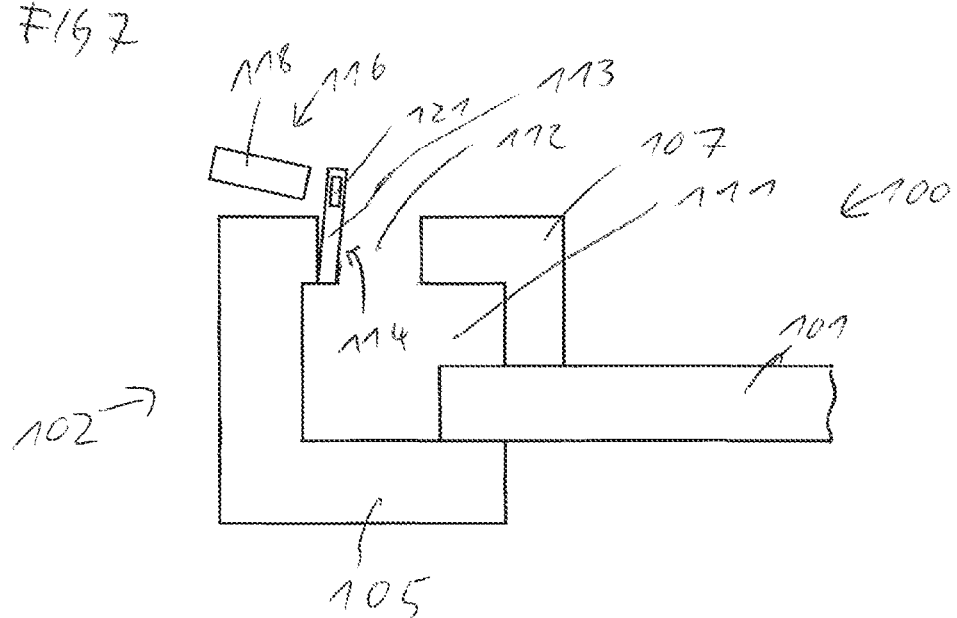
FIG. 7 shows a schematic illustration of a cross section through a device for producing an edging, according to embodiments.

FIG. 3 shows the device according to further embodiments. The device according to the exemplary embodiments of FIG. 3 corresponds substantially to the embodiments as have been explained in conjunction with the preceding figures. As opposed to the embodiments as have been explained in conjunction with FIG. 2, the molding tool 102 according to the embodiments of FIG. 3 comprises only two mold bodies 105 and 107. Moreover, with reference to the illustration of FIG. 2, the method is illustrated at a later point in time, at which the illustrated region of the space 111 has already been entirely filled with the material 119.

The first mold body 105 has the holding region 106. The panel 101 is disposed thereon. Moreover, the panel is held by the second mold body 107, or by the holding region 108, respectively. The space 111 is delimited by the panel 101 and by the internal faces 125 of the two mold bodies 105 and 107. The access duct 112 here remains unblocked such that the material 119 by means of the material dispenser 103 may be introduced into the space 111. The access duct 112 is configured between the first mold body 105 and the second mold body 107.

FIG. 4 shows the device 100 according to FIG. 2, after the material dispenser 103 has passed through the cross section illustrated. The illustration corresponds to a schematic section along the line B-B' of FIG. 12, transversely to the main direction of extent of the panel 101. The illustrated region of the space 111 is entirely filled by the material 119 of the edging 104.

A supply device 120 is provided for introducing a closure element 114 into the access duct 112. The closure element 114 closes the access duct 112 such that a closed space 111 is created. The closure element 114 is a flexible sealing tape 115, for example.

When viewed in the movement direction 127 of the material dispenser 103, the closure element 114 is installed in the access duct 112 behind the material dispenser 103. When viewed in the movement direction 127 of the material dispenser 103, the access duct 112 ahead of the material dispenser is unblocked and open such that the material dispenser 103 is moved through the access duct 112 without impediment. Curing of the material in a closed space 111 is enabled by closing the access duct 112 once the space 111 has been filled with the material 119 for the edging 104. Accurate molding of the shape on all external sides of the edging 104 is enabled on account thereof. Non-defined surfaces which cure without any shape-imparting delimitation are avoided.

Once the material 119 of the edging 104 has cured the mold bodies 105, 107, and 109, and the closure element 114 may be removed, and the panel 101 having the edging 104 may be further processed.

The closure element 114, prior to being introduced into the access duct 112, does not contact the mold bodies 107 and 109 which surround the access duct 112. As long as the access duct 112 is unblocked and open the closure element 114 is disposed so as to be spaced apart from the mold bodies 105, 107, and 109. The access duct 112 is open just prior to the material 119 being introduced into the space 111. The access duct 112 is closed by the closure element 114 once the material dispenser 103 has passed. A molding tool 102 which is open and which becomes a closed molding tool once the material 119 has been introduced into the space 111 is thus initially provided.

FIG. 5 shows the device 100 of FIG. 3 at a later point in time, corresponding to FIG. 4. The access duct 112 which is surrounded by the mold body 105 and by the mold body 107 is closed by the closure element 114 once the space 111 has been entirely filled with the material 119 of the edging 104. The closure element 114 is configured such, for example, as has been explained in conjunction with FIG. 4.

FIGS. 6 to 9 show the device 100 according to further embodiments. The device 100 according to FIG. 6 corresponds substantially to the device 100 as has been explained in conjunction with FIG. 3. As opposed to the exemplary embodiments of FIG. 3, the closure element 114 is fixed to the first mold body 105. The closure element 114 is already disposed in the access duct 112 before the material dispenser 103 passes through.

FIGS. 6 to 9 show a molding tool 102 having two mold bodies 105 and 107. The closure element 114 described in conjunction herewith, and the corresponding method for filling the space 111, are capable of being applied in an identical manner in the case of a molding tool 102 which has the three mold bodies 105, 107, and 109. The closure element 114 in this instance is fixed to the third mold body 109 and/or to the second mold body 107, for example.

According to the exemplary embodiments of FIGS. 6 to 9, the closure element 114 is fixed to the first mold body 105. According to further embodiments, the closure element 114 is fixed to the second mold body 107 (not shown). According to further embodiments, the closure element 114 is in two parts (not shown). One part is fixed to the first mold body 105, and the second part is fixed to the second mold body 107.

The closure element 114 is an elastic or flexible lip seal 113, respectively, for example. The lip seal 113 closes the access duct 112 such that a closed space 111 is provided.

In order for the space 111 to be filled, the closure element 114 is deflected from the rest position thereof such that the access duct 112 is unblocked. An opening device 116 is provided in order for the closure element 114 to be moved. The opening device 116 comprises, for example, a magnetic device 118 which is configured for effecting magnetic forces on a magnet 121. The magnet 121 is part of the closure element 114. The closure element 114 by way of the magnetic forces is moved such that the access duct 112 is unblocked. The opening device 116 in further embodiments is configured differently so as to exert a force on the closure element 114 and, on account thereof, to move the closure element 114 from the rest position thereof. A compressed-air device or a vacuum device is provided, for example. Alternatively or additionally, a lifting device which comes into contact with the closure element is provided so as to mechanically move the closure element.

The opening device 116 according to embodiments moves the closure element 114 only in portions. The closure element 114 is deflected and the access duct 112 is unblocked only in that region in which the material dispenser 103 moves as well as immediately ahead of and behind that region. Ahead thereof and behind, when viewed in the movement direction 127 of the material dispenser 103, the closure element 114 is in the rest position thereof and the access duct 112 is closed. To this end, the opening device 116 moves along the molding tool 102 conjointly with the material dispenser 103, for example.

The material dispenser 103, in that region in which the access duct 112 is unblocked, is disposed as is schematically illustrated in FIG. 8. In particular, that region in which the access duct 112 is unblocked and the material dispenser 103 move conjointly along the periphery 126 of the panel 101.

The closure element 114 by the opening device 116 is held such that the access duct 112 is open. According to embodiments, the closure element 114 is disposed so as to be spaced apart from the material dispenser 103. The material dispenser 103 does not contact the closure element 114 in order for the access duct 112 to be opened.

After the material dispenser 103 has passed through, the opening device 116 again unblocks the closure element 114, as is schematically illustrated in FIG. 9. The closure element 114 moves back to the rest state thereof, closing the access duct 112. After the material dispenser 103 has passed through, the space 111 in the cross section is thus closed on all sides. The material 119 of the edging 104 is thus cured in a closed molding tool 102.

FIGS. 10 and 11 show the device 100 as has been explained in FIG. 2, according to further embodiments. As opposed to FIG. 2, the closure element 114 is permanently fixed to the third mold body 109.

FIGS. 10 and 11 show a molding tool 102 having three mold bodies 105, 107, and 109. Accordingly, the closure element 114, as has been explained, and the corresponding method for filling the space 111 are also capable of being applied with the molding tool 102 having two mold bodies 105 and 107.

The closure element 114 corresponds substantially to the closure element 114 as has been explained in conjunction with FIGS. 6 to 9. As opposed to the embodiments of FIGS. 6 to 9, the closure element 114 according to FIGS. 10 and 11 is not opened by a separate opening device 116. The material dispenser 103, when passing, contacts the closure element 114, deflecting the latter. Prior to and after the material dispenser 103 passing/has passed, the access duct 112 is closed by means of the closure element 114.

The closed space 111 for curing and shaping the material 119 of the edging 104 is schematically illustrated in FIG. 11 after the material dispenser 103 has passed through. The closure element 114 delimits the space 111 on the access duct 112. The shape of the edging 104 is thus fixedly predefined also on the access duct 112.

The closure element 114 in the embodiments illustrated is fixed to the third mold body 109 which does not contact the panel 101. Thus, the closure element 114 is readily replaceable conjointly with the mold body 109, wherein the two mold bodies 105 and 107 which are configured for holding the panel 101 are retained. High flexibility is provided in terms of the external shape of the edging 104, on account thereof. According to further embodiments, the closure element 114 is fixed to the second mold body 107. According to further embodiments the closure element 114 is in multiple parts. For example, one part of the closure element 114 is disposed on the second mold body 107, a second part being disposed on the third mold body 109.

FIG. 12 schematically shows a plan view of the device 100 according to the embodiments of FIGS. 2 and 4. When another closure element 114, for example the lip seal 113 as has been explained in conjunction with FIGS. 6 to 9 or FIGS. 10 and 11, is provided instead of the sealing tape 115, the supply device 120 may be dispensed with. Moreover, the access duct 112, when viewed in the movement direction 127, is then not open ahead of the material dispenser 103, as is illustrated in FIG. 12, but is closed by the lip seal 113. In this instance, the access duct 112 is only opened in a region which is directly on the material dispenser 103.

The material dispenser 103 in the movement direction 127 moves along the periphery 126 around the panel 101. The space 111 thereby is filled with the material 119 of the edging 104. The space 111 is filled in the movement direction 127.

The periphery 126 in embodiments is not completely provided with the edging 104. The molding tool 102 according to embodiments then is also disposed on the panel 101 only in portions.

The supply device 120, when viewed in the movement direction 127, behind the material dispenser 103 is moved along the access duct 112. That part of the space 111 that has already been filled with the material 119 of the edging 104 is covered by the sealing tape 115.

The features which have been shown and described in the exemplary embodiments or embodiments, respectively, according to further and not explicitly illustrated exemplary embodiments may also be intercombined in further combinations. The invention relates in particular to any combination of features of the figures and of the patent claims, even if this feature or this combination has not per se been explicitly stated in the patent claims or in the exemplary embodiments.

For example, an opening device 116 together with a sealing tape 115 is possible. The sealing tape 115 which is not fixed to the mold bodies 105, 107, and 109, in this instance is already disposed in the access duct 112 prior to the material dispenser 103 passing through. The sealing tape 115 by way of the opening device 116 is moved out of the access duct 112 so as to open the access duct in regions for the material dispenser 103.

The device 100 and in particular the molding tool 102 in the respective exemplary embodiments serve for producing the edging 104 as a so-called foam molding and/or a so-called encapsulation casting. For example, if substantially atmospheric pressure or a pressure which is only insignificantly higher than the atmospheric pressure prevails in the space 111 while the material 119 is cured, reference is made to encapsulation casting of the panel 101. This is the case, for example, when the material 119 is cured in the space 111 without being substantially enlarged in terms of the volume thereof. If the material 119 comprises a polyurethane, for example, and a further component for foaming the polyurethane, reference is made to foam molding of the panel 101. Herein, the volume of the material 119 introduced in the space 111 is enlarged during curing, gas enclosures being configured in the edging 104, for example. In these cases, the closure element 114 and the coupling of the closure element 114 to the mold bodies are in particular configured in a corresponding manner so as to enable gas to exit from the space 111 during curing, for example. The closure element 114 and the coupling of the closure element 114 to the mold bodies are in these cases in particular configured in a corresponding manner so as to prevent the material 119 escaping from the space 111 during curing, for example.

The illustrated shapings of the internal faces 125 of the mold bodies 105, 107, and 109, and of the closure elements 114 are to be understood as being purely exemplary and schematic. The internal faces 125 may be shaped in an arbitrary manner so as to implement a predefined shape for the edging 104. The internal faces 125 are designed so as to be dependent on the predefined external shape for the edging 104.

According to further embodiments, the molding tool 102 has more than three mold bodies. For example, two mold bodies serve for holding the panel 101, the further mold bodies serving for configuring the space 111 according to the predefined shape for the edging 104.

The invention claimed is:

1. A device for producing an edging of a flat extended panel, the device having:
   a molding tool;
   a material dispenser which is movable in relation to the molding tool, for dispensing a material for the edging, wherein the molding tool has:
   a first mold body having a holding region for the panel;
   a second mold body having a holding region for the panel such that the panel is capable of being held by the first mold body and by the second mold body;
   a third mold body which with the first mold body shares a common contact region, wherein the first mold body, the second mold body, and the third mold body are configured such that they conjointly with the panel surround a space in which the edging is configurable; and
   an access duct to the space, the former being configured between the second mold body and the third mold body;
   wherein an elastic lip seal is fixed to the second mold body and/or to the third mold body, so as to close and temporarily unblock the access duct.

2. The device according to claim 1, wherein the second mold body and the third mold body are disposed so as to be movable in relation to one another.

3. The device according to claim 1, further comprising a separate closure element which is introducible into the access duct, so as to close the access duct in order for the space to be a closed space.

4. A method for producing an edging of a flat extended panel, the method comprising:
   providing the panel;
   providing a first mold body;
   laying the panel onto the first mold body;
   disposing a second mold body on the panel;
   disposing a third mold body such that the third mold body contacts the first mold body, wherein a space between the first mold body, the second mold body, and the third mold body, having an access duct between the second mold body and the third mold body, is configured; and introducing a material for the edging through the access duct into the space;

the method further comprising:

moving an elastic lip seal which is fixed to the second mold body and/or to the third mold body, on account thereof unblocking the access duct;

introducing the material through the unblocked access duct; and closing the access duct.

5. The method according to claim 4, the method further comprising:

installing a separate closure element in the access duct after the material has been introduced into the space, so as to close the access duct, on account thereof closing the space.

6. The method according to claim 5, the method further comprising:

installing a flexible sealing tape in the access duct.

* * * * *